United States Patent
Whitley et al.

[11] 3,798,044
[45] Mar. 19, 1974

[54] PROCESS FOR MANUFACTURING CALCINED KAOLINITIC CLAY PRODUCTS

[75] Inventors: James Brooks Whitley; William Floyd Abercrombie, Jr., both of Macon, Ga.

[73] Assignee: J. M. Huber Corporation, Locust, N.J.

[22] Filed: June 7, 1972

[21] Appl. No.: 263,381

[52] U.S. Cl............ 106/288 B, 106/309, 106/72
[51] Int. Cl.......................... C08h 17/06, C09c 1/28
[58] Field of Search.................... 106/288 B, 72, 309

[56] References Cited
UNITED STATES PATENTS

| | | | |
|---|---|---|---|
| 3,615,806 | 10/1971 | Sorok et al. | 106/288 B |
| 3,519,453 | 7/1970 | Morris et al. | 106/288 B |
| 3,171,718 | 3/1965 | Gunn et al. | 106/72 |
| 3,482,685 | 12/1969 | Malden et al. | 106/72 |

*Primary Examiner*—Delbert E. Gantz
*Assistant Examiner*—Jacqueline V. Howard
*Attorney, Agent, or Firm*—Harold H. Flanders

[57] ABSTRACT

A process for producing calcined mineral products having improved brightness and significantly reduced abrasion is disclosed. In accordance with the invention, mineral such as kaolin clay, are delaminated by agitating a slurry of the minerals in the presence of a hard, abrasive grinding media, such as glass beads, which have a specific gravity higher than the mineral-water suspension or mixture. The delaminated particulates are then filtered, dried and calcined at a temperature in excess of 750° C to remove the water of hydration and bring about a sharp exothermic reaction. In one method embodiment, the minerals or clays are subjected to a high intensity magnetic field, prior to the delamination, to remove foreign matter or contaminants which are deleterious to the production of a calcined pigment having a high brightness and a low abrasive index. The calcined products of the invention may be used in the coating and filling of paper, in paints, as reinforcing fillers or pigments in elastomers and the like.

4 Claims, 4 Drawing Figures

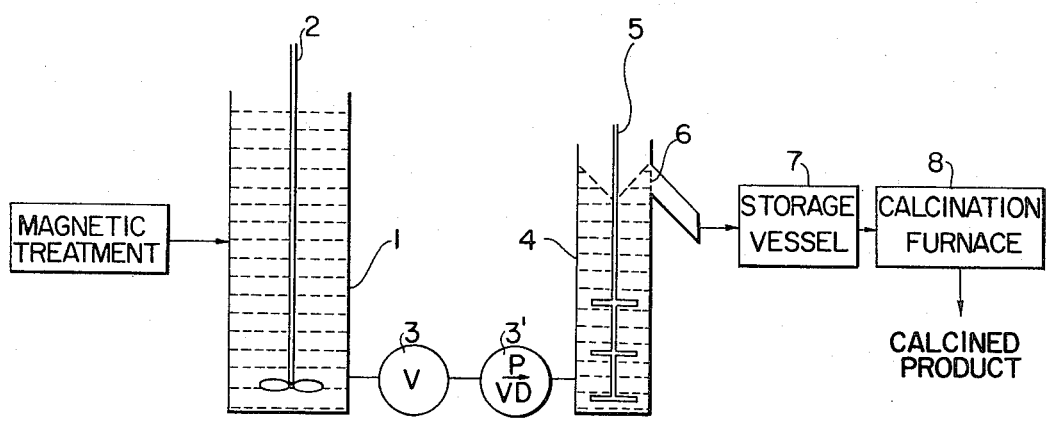
FIG. 1
FIG. 2
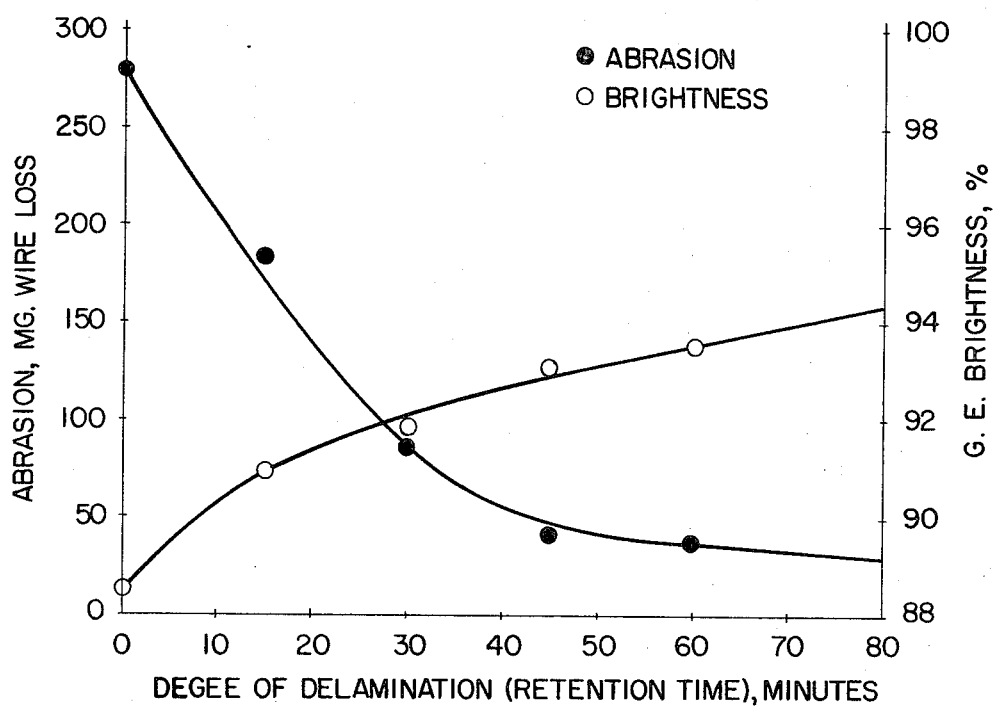

3,798,044

PROCESS FOR MANUFACTURING CALCINED KAOLINITIC CLAY PRODUCTS

BACKGROUND OF THE INVENTION

The present invention relates to calcined mineral products and, more particularly, to an improved process for producing high brightness, low abrasion calcined clay pigments.

As known in the art, for many years the conventional method for producing high grade clays or mineral products, such as required, for example, in the coating of paper, involved the deflocculation of the crude material in an aqueous suspension and thereafter classifying the crude, as by sedimentation, into fine and coarse fractions. In more recent years it has been found that so-called delaminated clays, produced from coarse or coating grade clay fractions, are in many cases superior to coating clays made by the conventional classification of the natural crude. In this regard, delaminated clays, by virtue of the great breadth and thinness of the particles, give a smoother coated surface with improved printability. Enhancement in brightness is also achieved from delamination for the reason that fresh unstained surfaces are exposed by exfoliation of the clay "stacks" into thin units. In general, and again as known in the art, crude clay deposits, such Georgia kaolins, contain particles ranging in size from smaller than 0.1 micron to at least 15 microns. Particles smaller than about 1 - 3 microns in diameter are mostly plate-like in shape with the diameter averaging 6 - 10 times the thickness. Particles larger than about 1 - 3 microns are substantially all multi-crystalline stacks composed of varying numbers of single crystals, cemented together in a face-to-face fashion. Coarse clays, as the term is utilized in the present description, include those clays composed substantially of stacks as well as clays composed of mixtures of stacks and fine crystals of the clay. Delaminated clays are produced from these thick laminated masses by splitting the stacks into thin platey units.

There are presently a number of known and available methods for producing delaminated clays. Thus, in U.S. Pat. No. 3,171,718 there is disclosed a process wherein delamination is accomplished by agitating an aqueous slurry with a fine, non-abrasive resilient grinding media such as nylon beads or pellets. This patent also discloses a method of first preparing the delaminated clay product with the non-abrasive media and thereafter subjecting the delaminated product to calcination. The term "calcination" as conventionally used, refers to the heating of clay to remove the water of hydration and to bring about a sharp exothermic reaction as shown in conventional differential thermal analysis curves. In the aforesaid patent it is suggested that the delaminated calcined clay products possess a high G.E. brightness and abrasion indices lower than undelaminated clays which are subsequently calcined.

U.S. Pat. No. 3,519,453 discloses a further process for preparing kaolin clay products wherein the clay is first delaminated with a non-abrasive resilient plastic grinding media and is thereafter subjected to heat treatment. In this patent the delaminated clay is heated "at least until an endothermic reaction begins" with the heating being stopped prior to the initiation of the exothermic reaction. In this patent it is suggested that the process thereof produces high brightness, low abrasion individual platelets which have increased void volume and high bulking properties. Though many such above discussed methods have been adopted and have achieved commercial acceptance, none has proved entirely satisfactory. While so-called "low intensity" grinding techniques employing non-abrasive or plastic grinding media produce a high quality delaminated clay product, such processes suffer from the inherent disadvantage of slow grinding rates, resulting in the increased cost of production, relatively low yield rates and inability to obtain maximum available brightness. Further and with regard to the instant invention, calcined mineral products produced by the above and further known processes, though often having a suitable G.E. brightness, have been found to have an abrasion index that is too high for many applications. This is true notwithstanding very extensive and ever continuing research efforts in that industry.

SUMMARY OF THE INVENTION

In summary, the present invention provides a highly efficient and unique process for producing calcined comminuted minerals having increased brightness and a significantly reduced abrasion. In its broadest aspect, the invention is based on the discovery that up to a 90 percent reduction in abrasion as well as increased brightness can be achieved by subjecting an aqueous slurry of the minerals, e.g., kaolin clay, to agitation in the presence of a granular grinding medium harder than the mineral solids to be ground, for a period of time to effect substantial delamination of the minerals and thereafter calcining the delaminated product at a temperature of at least 750° C and preferably in the range of from about 800° to 1,000° C. In accordance with one particularly advantageous embodiment of the invention, the minerals are also subjected to a high intensity magnetic field to effect separation of magnetically susceptible contaminants.

It is accordingly a general object of this invention to provide a unique process for producing calcined comminuted minerals having high brightness and reduced abrasion.

Another and more particular object of the invention is to provide a highly efficient and economical process for producing high quality calcined clays having improved properties.

Yet another object is to provide an improved calcined pigment having a high brightness and a low abrasion index.

BRIEF DESCRIPTION OF THE DRAWINGS

The manner in which the foregoing and other objects are achieved in accordance with the present invention will be better understood in view of the following detailed description and accompanying drawings which form a part of this specification, and wherein:

FIG. 1 is a diagrammatic illustration, shown in elevation, of a suitable arrangement of apparatus for carrying out a particularly advantageous embodiment of the invention;

FIG. 2 is a graph showing the effect of glass bead delamination of a coarse clay fraction prior to calcination on the calcined product;

DESCRIPTION OF THE PREFERRED EMBODIMENT(S)

Figure 3:
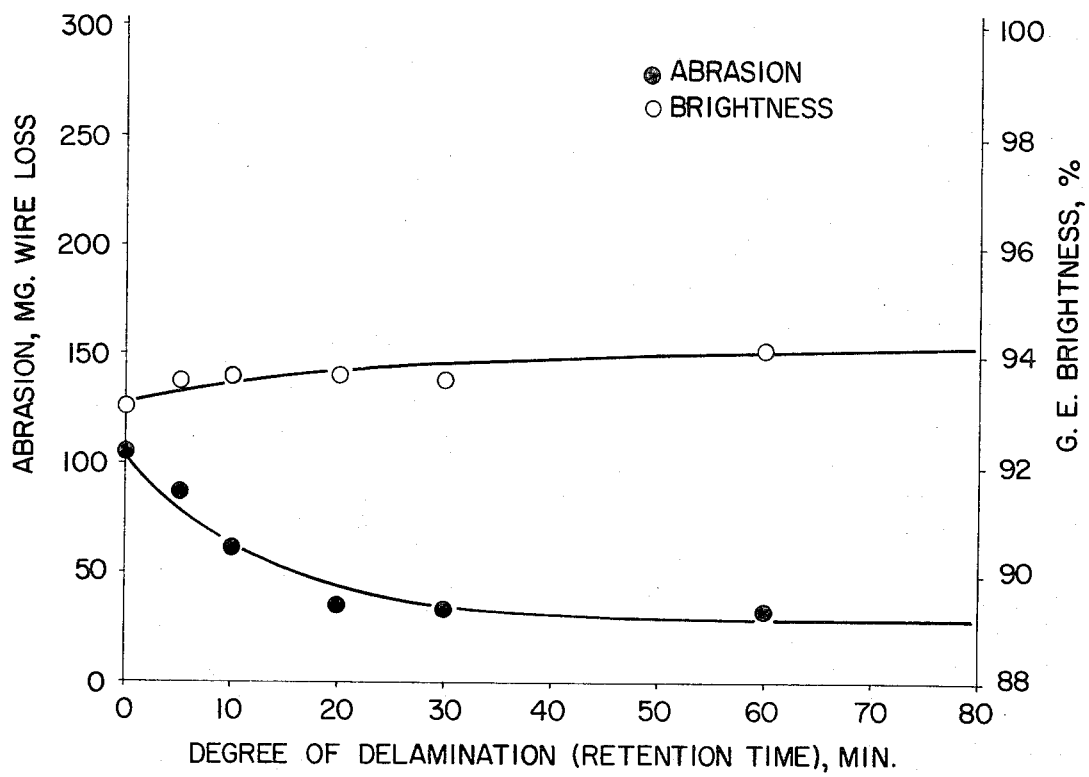
FIG. 3 is a graph showing the effect of glass bead delamination of a fine clay fraction prior to calcination on the calcined product.

As briefly discussed above, the present invention is based on the discovery and embodies the concept that the hard abrasive grinding or delamination of mineral pigments, such as kaolin clay, followed by calcination produces a product with an improved brightness and a low abrasion.

In the practice of the invention, as will be described in more detail hereinafter, a mineral or clay slurry is subjected to delamination by the high intensity grinding action obtained by agitating the slurry with hard, abrasive grinding medium which has a specific gravity higher than the clay-water mixture. Suitable media include small beads of glass, sand or fused alumina, the former being found to be a particularly advantageous medium. The necessary agitation may be obtained by either high frequency vibration or by mixing with a suitable impeller. The specific gravity of the media is important for the reason that the use of media which are heavier than the mineral or clay slurry results in greater impact forces and more complete delamination. Complete delamination is important in that stacks not delaminated are calcined to hard particles which contribute significantly to abrasion.

Following delamination, the thin plate-like particulates are calcined by heating the product to a temperature sufficient to drive off the mechanical or hygroscopic water from the clay or mineral, as well as the combined water and also with further heating to bring about an exothermic reaction. Preferably the clay fraction is calcined by heating to a temperature in the range of about 800° to 1,000° C. The calcining can be carried out in calcining apparatus which are fed continuously and from which the calcined material is continuously discharged with stirring or agitation of the clay during the calcination. However, any conventional apparatus, as for example, a rotary furnace, drum furnace, muffle furnace, indirect furnaces or the like, provided with suitable temperature controls, etc., may be employed. If desired, the delaminated product may be dried and/or pulverized prior to calcination. In general, however, the calcined product must be pulverized and/or sized to break up or remove aggregates formed during calcination.

While the concept of using an abrasive grinding medium, such as sand, for delaminating minerals or clay is generally known and disclosed, for example, in U.S. Pat. No. 3,075,710, in accordance with a particularly advantageous method embodiment of the invention, the mineral or clay pigments are, prior to calcination, delaminated in accordance with the teachings and disclosure of U.S. Pat. Application Ser. No. 885,168, filed Dec. 15, 1969, now U.S. Pat. No. 3,667,689. In this patent there is disclosed a process for effectively utilizing the inherent advantages of the hard, abrasive grinding medium, i.e., high grinding rates and high yields. Subjecting the minerals to a high intensity magnetic field removes finely divided, discolored particles which are a predominant deterrent to the development of brightness in such systems.

In accordance with the invention, it has been found that the abrasiveness of the calcined product is not only a function of the type of grinding media employed but is also dependent upon, or a function of, the absence of impurities. Thus in a preferred and particularly advantageous method embodiment, the mineral or clay particles are subjected to a high intensity magnetic field to remove such impurities. Magnetic separation techniques adapted to remove foreign particles or contaminants are disclosed e.g., in French Pat. No. 1,490,027 and British Pat. No. 1,004,570. In a preferred embodiment of the invention, the magnetic separation treatment comprises forming a slurry of the clay or mineral and then subjecting the slurry to the action of a non-homogeneous magnetic field having an average strength of at least 1,000 gauss and preferably at least 8,500 gauss. The magnetic treatment can be carried out by employing wet magnetic separator machines such as disclosed in British Pat. No 768,451. A particularly advantageous process of magnetic treatment however is disclosed in U.S. Pat. No. 3,471,011. A process generally of this type is schematically illustrated as a pre-treatment prior to delamination in FIG. 1. As used herein, the term "wet magnetic separation" refers to the fact that the clay particles and impurities are passed through the separator suspended in water. The slurries are retained within the high intensity magnetic energy field for a controlled period of time, preferably from about 10 seconds up to about 8 minutes. The high intensity of the magnetic energy field may vary from 1,000 gauss to the limitation of the particular machine.

In general, the concentration of the clay slurry is not critical below 45 percent solids in the magnetic phase. Thus, preferably the percent solids may vary from about 15 percent to about 45 percent. Preferable slurry concentrations are in the range of 25 – 35 percent by weight, solids content. The clay slurries treated in the magnetic energy field are preferably deflocculated, using conventional dispersing agents such as sodium hexametaphosphate or sodium silicate. As should be apparent, the slurry may be passed through the magnetic separator more than once to effect successive removals of the contaminants.

Turning now to further details of the invention and with reference again to the abrasive media employed, glass beads provide a faster grinding rate than materials such as sand due to their spherical nature which provides better contact and faster than plastic due to their high specific gravity and hardness. As compared to sand, they have a higher crushing strength and therefore provide less contamination than sand. The glass beads are more homogeneous in structure and, in general, have less fractures or fissures to weaken them and cause breakage. Also, a variety of glass beads are available with a more uniform spherical shape which results in a faster grinding and better contact of the media. As disclosed in detail in the aforementioned U.S. Pat. No. Application Ser. No. 885,168, in addition to variables such as the media/slurry ratio, agitation speed, etc., various effects may be obtained by balancing size of media versus the number of frequency of impingements. Thus, glass beads permit tailored results by using various sized distributions of beads. For example, one can achieve optimum effects by proper selection of bead size. An increase in the size of media yields larger grinding intensity and forces but fewer impingements. Further, glass beads provide for better intermittent operation because they are easier to re-suspend than sand, etc., on start-up. As set forth above, the specific gravity of the media or beads should be greater than that of the clay-water suspension. A clay-water slurry containing 30 percent clay has a specific gravity of approximately 1.23, whereas the preferred glass beads generally have a specific gravity of about 2.45. An example of glass beads suitable for use in the present invention are those identified as Class IV, Type 203 Uni-Spheres, manufactured by the Microbeads Division of Cataphote Corp., which have a specific gravity of about 2.45 and a diameter in the range of about 20 mesh to 30 mesh (Tyler standard screen scale).

As briefly noted above, the process of delamination as well as calcination can be carried out batch-wise or as a continuous process. The delamination is preferably carried out in a continuous manner with the suspension of the minerals in water circulating through an agitated suspension of beads with the mineral suspension flowing from the grinding tank through a screen which restrains the media. In either batch-wise or continuous operation, agitation of the hard, abrasive media, e.g., glass beads, in the mineral or clay suspension is sufficient to provide the percussive and frictional milling action required to produce fast and complete delamination. The process is continued until the coarse clay stacks or booklets are delaminated and converted into platelets of the desired or specified particle size. In general, any conventional tank or vessel equipped with agitating means, etc., may be employed in practicing the delamination step of the present invention. Suitable apparatus for delaminating clay fractions are disclosed, e.g., in U.S. Pat. Nos. 3,075,710 and 3,171,718. As known in the art, the vessel and agitator may be covered with rubber or other suitable elastomer to avoid abrasion and wear of the metal parts.

In this regard, FIG. 1 illustrates a suitable and particularly advantageous arrangement of apparatus that may be employed in the practice of the invention. Here, the slurry or suspension, after being subjected to the magnetic treatment, is introduced into a feed tank 1 which is provided with suitable mixing means 2 to maintain the mineral or clay particles in suspension. The slurry is then charged into a delamination or grinding vessel 4 which is provided with a suitable impellor 5 and a screen 6. In the case of continuous operation, the flow of the slurry from the feed tank 1 is initiated by opening the valve 3 with the rate of flow into the vessel 4 then being controlled by a variable speed pump 3' to provide the necessary retention time in the vessel 4. The delaminated slurry overflows from the vessel 4 through the screen 6 which serves to retain the grinding media in the vessel. The delaminated mineral or clay slurry may then be introduced into a storage or hold tank 7 or filtered, dried and charged into the calcination furnace 8. As previously discussed, the calcination may be carried out continuously or as a batch operation, with the former being preferred.

The following examples and tables will serve to better illustrate the present invention but are not intended to limit it thereto. Unless otherwise indicated, the apparatus employed was substantially that as illustrated in FIG. 1.

EXAMPLE I

In this example, delaminated clays were prepared with and without the use of magnetic treatment. The starting material was a dispersed unleached slurry of a coarse filler clay having a brightness of 79.4 and a particle size as follows:

| | |
|---|---|
| Coarser than 10 microns | 15.8% |
| Coarser than 5 microns | 36.2% |
| Finer than 2 microns | 35.9% |

A portion of the slurry containing 30 percent clay solids was magnetically treated in a magnetic separator having a 4 inch diameter by 20 inches high magnetic extraction chamber placed in a vertical position between the magnetic poles of the separator. The dispersed slurry at 30 percent solids was pumped into the bottom and flowed from an outlet at the top of the chamber. Flow rate through the chamber was controlled to give a 1 ¼ minute retention of the slurry in the magnetic field. The magnetic field strength was 11,000 gauss at the ends of the chamber and decreased to 6,000 gauss at the center of the chamber. The 30 percent solid slurries, with and without the magnetic treatment, were then delaminated to a particle size of 78.1 percent finer than 2 microns employing the apparatus and the continuous one-pass procedure illustrated in FIG. 1. Class IV, Type 203 Uni-Sphere glass grinding media (20 – 30 mesh), supplied by Cataphote Corp., were used. Specific operating conditions for the delamination were as follows:

| | |
|---|---|
| Media/slurry volume ratio | 55:45 |
| Impeller speed | 1300 f.p.m. |
| Retention in mixing tank | 60 minutes |
| Clay-water concentration | 30% clay |

Effects of delamination with and without magnetic treatment on brightness prior to calcination are shown in Table 1.

TABLE 1

Brightness Prior To Calcination

| Without Magnetic Treatment | Brightness,% |
|---|---|
| 1. Before delamination | 79.4 |
| 2. After delamination | 82.0 |
| With Magnetic Treatment | |
| 1. Before magnetic treatment | 79.4 |
| 3. After magnetic treatment | 82.5 |
| 4. After magnetic treatment and delamination | 85.2 |

The clay products of Table 1 were then filtered, dried, pulverized using a 0.020 screen in a Mikrosample mill and calcined in a Harper electric furnace at 1,000° C for one hour. After the calcination, the products were cooled to 540° C, removed from the furnace, air cooled and pulverized by two passes through the Mikrosample mill. Effects of delamination with and without magnetic treatment on brightness and abrasiveness of the calcined products are shown in Table 2.

EXAMPLE II

In this series of tests, the magnetically treated coarse clay fraction shown as Product 3 in Table 1 was sub-

TABLE 2

Brightness and Abrasion After Calcination

| Without Magnetic Treatment | Brightness, % | Valley Abrasion Mgs. Loss |
| --- | --- | --- |
| Before delamination | 85.6 | 342 |
| After delamination | 92.6 | 50 |
| With Magnetic Treatment | | |
| Before magnetic treatment | 85.6 | 342 |
| After magnetic treatment | 88.1 | 280 |
| After magnetic treatment and delamination | 93.5 | 38 | jected to varying degrees of delamination prior to calcination. Effect of varying the degree of delamination on brightness and abrasion of the calcined product is shown in FIG. 2. Both brightness and abrasiveness are progressively improved by increasing the degree of delamination.

EXAMPLE III

In this example, a dispersed but unleached clay slurry having a particle size of 90.1 percent finer than 2 microns was magnetically treated and delaminated for different periods of time prior to calcination. The important effect of the degree of delamination on brightness and abrasion of the calcined products is shown in FIG. 3.

EXAMPLE IV

Figure 4:
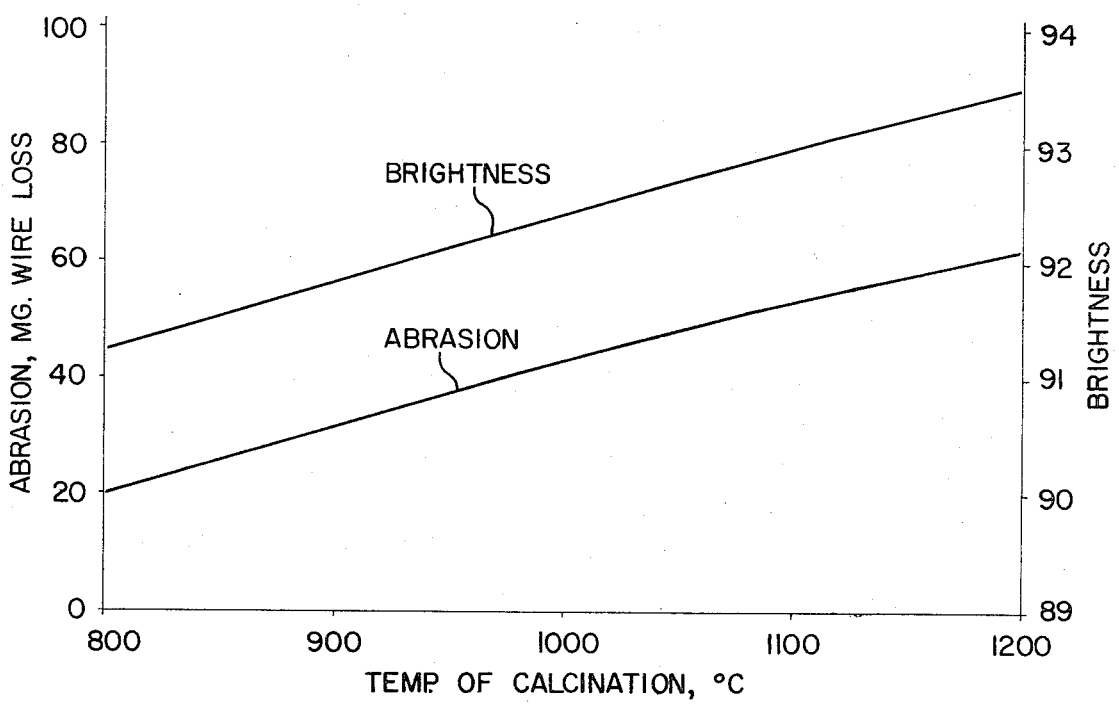
FIG. 4 is a graph showing the effect of the calcination temperature upon the abrasion and brightness of the finished product.

Several process variables were studied with the following general results and conclusions with respect to effect on the calcined clay products.

a. Magnetic treatment without the delamination step not only improved brightness but also reduced abrasiveness.

b. Leaching of the clay with conventional chemicals such as zinc, or sodium dithionite prior to the calcination improved the final brightness but was detrimental to abrasion unless the leaching chemicals were removed by washing or ion-exchange treatment prior to the calcination.

c. Soaking of the clay slurry with acid or alkali treatment prior to filtration, drying and calcination gave significant reductions in abrasiveness and increased brightness.

d. Treatment of the dry clay with vegetable oils such as corn oil prior to the calcination reduced abrasion.

e. The effect of the calcination temperature on the abrasion and brightness of the finished product is shown in FIG. 4.

As should be readily apparent to those skilled in the art, the present invention provides a unique, highly efficient process for preparing delaminated calcined products having particularly desired properties. While the above examples set forth specific embodiments and process conditions for practicing the invention, it should be expressly understood that the invention is not limited thereto inasmuch as many different embodiments, such as variations in the type of equipment employed, will be readily apparent. Further, the method of the invention is applicable to minerals other than kaolinite, such as pyrophyllite, mica, natural and synthetic silica pigments, talc, etc. Thus, while the present invention finds particular use in the processing of and production of delaminated calcined clays, the invention is not limited thereto.

What is claimed is:

1. A method for producing calcined kaolinitic clay pigments having improved brightness and low abrasion, said method comprising the steps of subjecting a dispersed kaolin clay aqueous slurry to a high intensity magnetic field of at least 8,500 gauss for a period of time to effect separation of magnetically susceptible contaminants from said kaolinitic clay; withdrawing said aqueous slurry from said magnetic field; subjecting at least a portion of said kaolinitic clay suspended in said slurry to agitation in the presence of a granular abrasive grinding medium, with a specific gravity greater than said kaolinitic clay aqueous slurry and harder than the kaolinitic clay solids to be ground, for a period of time to effect substantial delamination of said kaolinitic clay, recovering the delaminated kaolinitic clay and calcining said kaolinitic clay at a temperature in the range of from about 750° C to 1,000° C to produce a calcined kaolinitic clay product having a G.E. brightness of at least 90 and a valley abrasion index of less than 100.

2. The method in accordance with claim 1, said method further comprising continuing said agitation to produce a clay fraction having an average particle size of less than 2 microns.

3. The method in accordance with claim 1 wherein said granular grinding medium is glass beads which occupy at least 30 percent of the volume of the media-slurry mixture in the delamination of said coarse clay fractions, said glass beads being substantially uniform and spherical and having diameters in the range of from about 10 mesh to 60 mesh on the Tyler standard screen scale.

4. The method in accordance with claim 1, said method further comprising preparing a kaolin clay-water slurry of predetermined solids content, passing said slurry through a magnetic separator substantially continuously, retaining said slurry within the high intensity magnetic field of said separator to effect separation of magnetically susceptible contaminants, passing said magnetically separated slurry to a feed tank, establishing a predetermined kaolin solids content and particle size within said feed tank, continuously pumping said slurry from the feed tank to a delamination vessel at a controlled flow rate to maintain predetermined conditions within said delamination vessel and to maintain a predetermined retention time within said delamination vessel, continuously withdrawing delaminated kaolin clay pigments from said vessel and calcining said pigments at a temperature of at least 800° C.

* * * * *